United States Patent [19]

Boyd, Jr.

[11] 3,889,317

[45] June 17, 1975

[54] APPARATUS FOR REMOVING A STERNUM FROM A CHICKEN CARCASS

[75] Inventor: Roy W. Boyd, Jr., Elmhurst, Ill.

[73] Assignees: Irving Rosen, Lincolnwood; Gerald J. Rosen, Morton Grove, both of Ill.

[22] Filed: Nov. 29, 1973

[21] Appl. No.: 419,937

[52] U.S. Cl. ............................ 17/11; 17/46; 17/45
[51] Int. Cl. ............................................ A22b 3/08
[58] Field of Search ........... 17/46, 1 R, 1 G, 11, 45, 17/52; 426/478, 479, 480; 99/553, 562, 565

[56] References Cited
UNITED STATES PATENTS

| 828,193 | 8/1906 | Charky | 241/273.1 |
|---|---|---|---|
| 1,915,869 | 10/1931 | Rowley | 241/273.1 X |
| 3,389,447 | 5/1967 | Theobald et al. | 241/273.1 X |

*Primary Examiner*—Robert Peshock
*Assistant Examiner*—James Hamilton

[57] ABSTRACT

An apparatus is provided for removing a sternum, sometimes referred to as a keel bone, from an uncooked chicken carcass which has been slit longitudinally and spread apart so as to expose the sternum and ribs thereof. The apparatus includes a stationary supporting surface on which is placed the carcass in an inverted position. An elongated opening is formed in the supporting surface and is sized to permit the sternum to pass therethrough subsequent to being separated from the carcass as the latter is moved across the surface and lengthwise of the opening. An elongated fixedly mounted element protrudes upwardly and rearwardly from the forward end of the opening and terminates adjacent the opposite or rear end of the opening. The protruding portion of the element is slotted and the terminating end is tapered and spaced above the supporting surface so that the leading end of the sternum will pass therebeneath.

9 Claims, 7 Drawing Figures

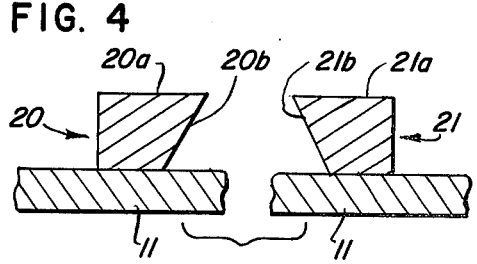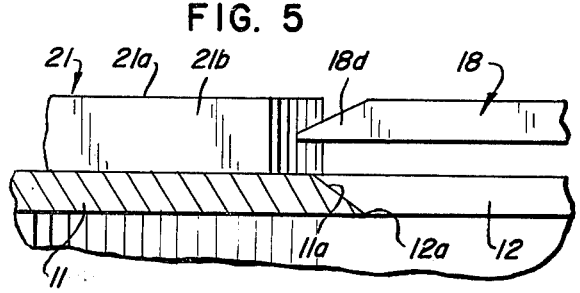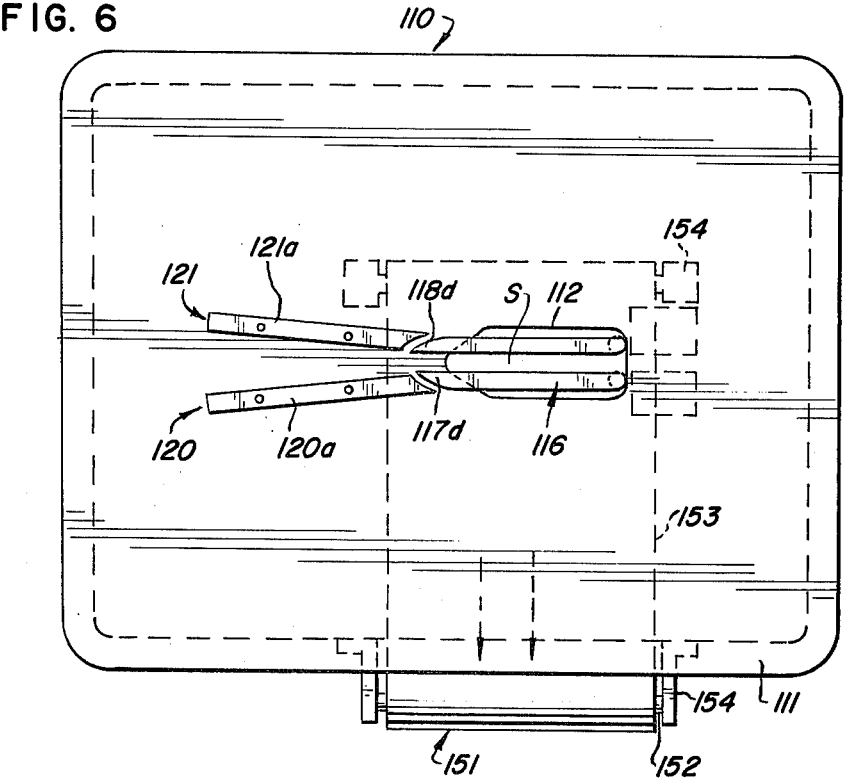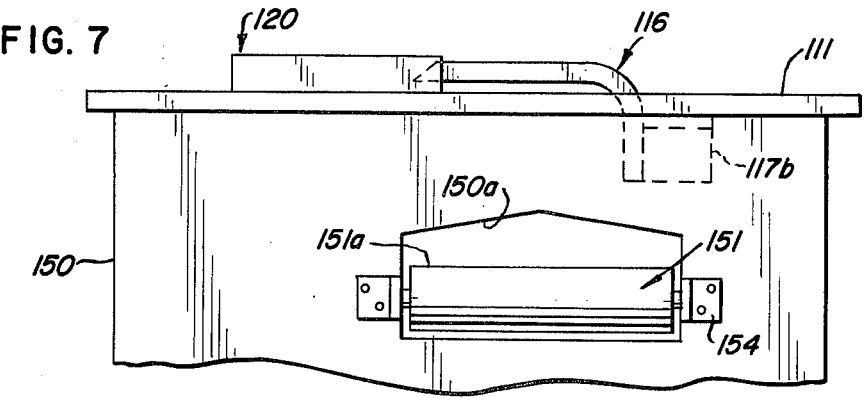

APPARATUS FOR REMOVING A STERNUM FROM A CHICKEN CARCASS

BACKGROUND OF THE INVENTION

The removal of the sternum or keel bone from an eviscerated, uncooked chicken carcass or breast has heretofore normally been a frustrating, awkward, manual operation utilizing one or more knives. The effectiveness and speed of such an operation have been dependent upon the skill and dexterity of the person performing the operation.

Various apparatus have heretofore been provided in an effort to overcome some of the problems associated with the manual deboning operation. Such apparatus, however, have met with limited success because they were beset with one or more of the following shortcomings: (a) the apparatus was of complex and costly construction; (b) the apparatus was difficult to clean and maintain in proper working order; (c) the apparatus was ineffective in removing the entire sternum and was not capable of accommodating carcasses varying in size over a wide range; and (d) the apparatus was difficult, awkward, and hazardous to operate manually.

SUMMARY OF THE INVENTION

Thus, it is an object of the invention to provide a sternum-removing apparatus which overcomes the aforenoted shortcomings associated with prior apparatus of this general type.

It is a further object of the invention to provide an apparatus which is of compact and simple construction, is easy and safe to operate, and is capable of handling a variety of carcasses.

It is a further object of the invention to provide a sternum-removing apparatus which will not deleteriously affect the flesh (meat) of the carcass.

It is a still further object of the invention to provide an apparatus which may be readily positioned on a waste container thereby facilitating the handling of waste produced during the deboning operation.

Further and additional objects will appear from the description, accompanying drawings and apparended claims.

In accordance with one embodiment of the invention, an apparatus is provided for removing a sternum (keel bone) from an eviscerated, uncooked chicken carcass which has been slit longitudinally and spread apart so as to expose the sternum and ribs of the carcass. The apparatus comprises a planar supporting surface on which the spread apart carcass is placed in an inverted position. The surface has an elongated opening formed therein which is sized to permit the sternum to pass therethrough subsequent to being separated from the remainder of the carcass. Mounted on and projecting upwardly from the supporting surface is a pair of elongated, relatively spaced guide members which are arranged so as to converge towards one end of the opening. The guide members are adapted to be slidably engaged by the ribs and adjacent portions of the carcass with the sternum disposed between the guide members and in contact with the supporting surface as the carcass is moved thereacross. Projecting upwardly from the opposite or forward end of the opening and curved rearwardly so as to overlie in spaced relation the remainder of the opening is an elongated rigid element. The free end of the element is tapered and slotted and is spaced above the plane of the supporting surface a sufficient amount so that an end of the sternum will pass therebeneath as the inverted, spread-apart carcass is moved across the supporting surface and lengthwise of the opening. The slotting of the tapered end enables a narrow, thin, upwardly extending finlike projection formed on the sternum to move past the tapered end while the sternum is moving lengthwise of the opening. As the carcass is moved lengthwise of the opening, the curvature of the element at the forward end of the opening will engage the leading end of the sternum and cam same downwardly and away from the remainder of the carcass and cause the sternum to separate therefrom without deleteriously affecting the flesh of the carcass. The separated sternum passes through the elongated opening and is directed into a waste container.

DESCRIPTION

For a more complete understanding of the invention, reference should be made to the drawings wherein FIG. 1 is a top plan view of one form of the improved apparatus shown mounted on the upper open end of a waste container.

FIG. 4 is an enlarged sectional view taken along line 4—4 of FIG. 1.

FIG. 5 is a fragmentary sectional view taken along line 5—5 of FIG. 3.

FIG. 6 is similar to FIG. 1 but showing a modified form of the improved apparatus.

FIG. 7 is similar to FIG. 2 but of the modified apparatus of FIG. 6.

Figure 1:
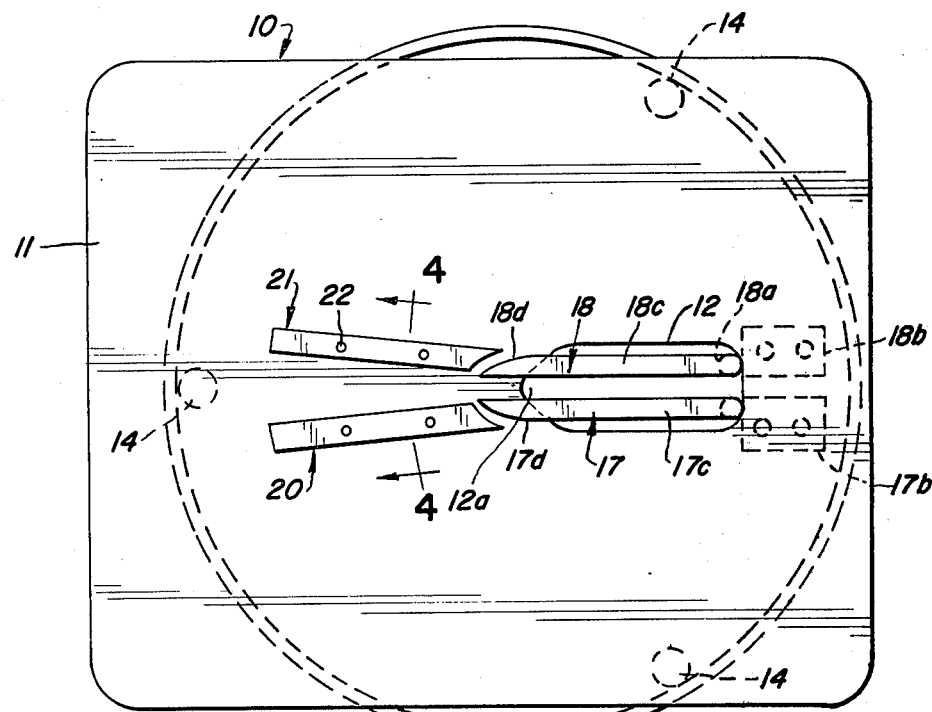
Figure 2:
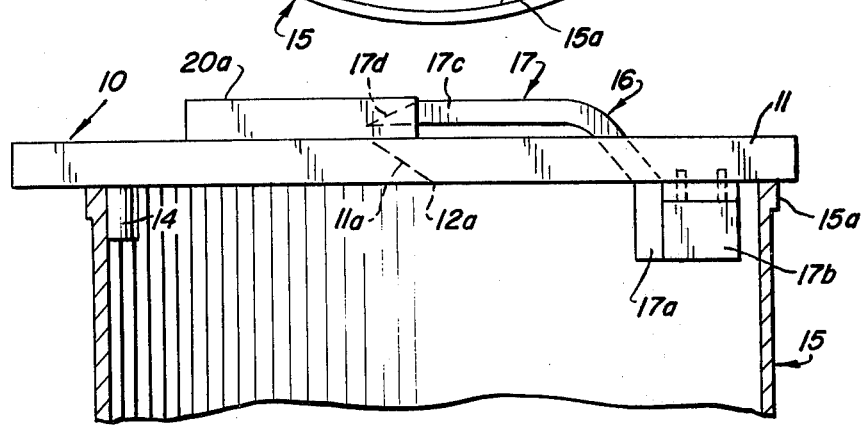
FIG. 2 is a fragmentary side elevational view of the apparatus of FIG. 1 and showing the waste container in vertical section.
Figure 3:
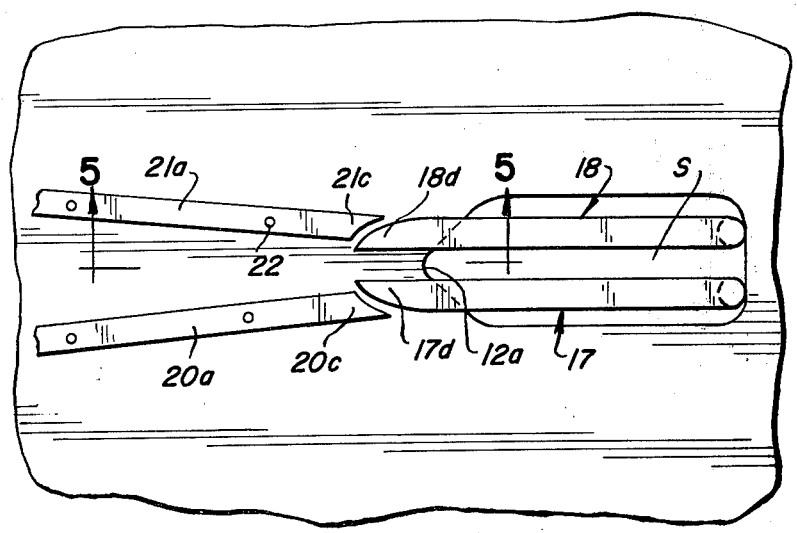
FIG. 3 is an enlarged top plan view of the tapered slotted end of the elongated element shown in spaced overlying relation with respect to one end of the opening formed in the supporting surface and in close proximity to the convergent ends of the guide members.

Referring now to the drawings and more particularly to FIGS. 1 and 2, one form of an improved sternum or keel bone removing apparatus 10 is shown. The apparatus is adapted to be used in conjunction with an eviscerated, uncooked chicken carcass which has been longitudinally slit, and spread apart whereby the sternum and the ribs are exposed. The term "chicken carcass" as used herein is intended to include the breast of a chicken or other poultry having similar anatomical characteristics.

Apparatus 10 includes a planar supporting surface 11 having an elongated opening 12 formed therein. The supporting surface may be of stainless steel or some other suitable material which has inherent strength and can readily withstand repeated washings with strong detergents or cleaning compounds. The opening 12 is sized or dimensioned so that a sternum, subsequent to being separated from the remainder of the carcass, will readily pass therethrough.

The underside of surface 11 may be provided with a plurality of depending pins or protuberances 14 which are arranged so as to properly locate the surface on the upper open end 15a of a waste container 15.

Projecting upwardly from one end of the opening 12 is an elongated rigid element 16, sometimes referred to as a rail. In the illustrated embodiment, the element is formed from a pair of rodlike members 17 and 18 arranged in spaced parallel relation. One end portion 17a or 18a of each member depends from the underside of the surface 11 and is affixed to an attaching bracket 17b or 18b. Each bracket, in turn, is affixed to the underside of surface 11 by suitable fasteners or the like. The opposite end portion 17c or 18c of the rodlike member is of pronglike configuration and curves upwardly and rearwardly to form a predetermined angle with the surface of from approximately 15° to approximately 30°. The end portions overlie the remainder of the opening 12. The distal or free end 17d or 18d of the member 17 or 18 terminates adjacent the rear end of the opening and is tapered so as to form a pointed tip. The free end is elevated relative to the upper or exposed side of surface 11 by an amount sufficient to permit the leading end of the sternum to pass thereunder as the carcass is moved across the surface towards the rear end of the opening.

A pair of elongated guide members 20 and 21 may be mounted on and extend upwardly from the surface 11. The guide members are arranged in spaced relation and converge towards the rear end 12a of the opening 12, see FIG. 1. The forward ends of the guide members terminate at the rear end of the opening and are disposed on opposite sides of the tapered free ends of the rodlike members. The guide members may be either fixedly or removably secured to the surface by suitable fasteners 22. The upper surface 20a or 21a of each guide member may be flat and is elevated relative to the upperside of the supporting surface by an amount at least as great as that of the pointed ends 17d and 18d of the rodlike members 17 and 18. Thus, by having the upper surfaces so disposed, there is no problem of having the fingers of the operator impaled on the pointed ends 17d and 18d. The guide member upper surfaces are adapted to be slidably engaged by the ribs and adjoining portions of the carcass during the sternum-removing operation which will be described more fully hereinafter.

As seen in FIG. 4, at least the portion of the opposed inner sides 20b and 21b of the guide members 20 and 21 adjacent the convergent ends 20c and 21c thereof are bevelled or undercut so that the upper edge of the side 20b or 21b will overhang the lower edge thereof. By having these sides of the guide members so contoured, the exposed sternum, when depressed between the guide members and engaging the upperside of surface 11, will be guided by the bevelled sides so as to be aligned with the pointed ends of the element as the carcass is moved across the surface towards the element 16 and opening 12.

As previously noted, the leading or forward ends 20c and 21c of the guide members terminate adjacent the end 12a of the opening 12 and the ends 17d and 18d of the rod members 17 and 18. It will be noted in FIG. 5 that the portion 11a of the surface 11 circumjacent the end 12a of the opening is downwardly inclined a slight amount. The inclined surface portion facilitates positioning the end of the sternum beneath the pointed ends 17d and 18d.

FIGS. 6 and 7 disclose a modified form of the improved apparatus 110. Apparatus 10 and 110 are similar to one another except that apparatus 110 is self-supporting and includes a vertical frame 150 which is adapted to rest upon a floor or platform. The frame 150 horizontally supports and is connected to the underside of the surface 111. The opening 112, the protruding element 116 and the guide members 120 and 121 are of the same configuration as those previously described with respect to apparatus 10.

Mounted on the frame 150 and spaced beneath the supporting surface 111 and in registration with the opening 112 is an endless conveyor 151 which is power driven in such a way that the upper run 151a thereof will move laterally in one direction, see arrows in FIG. 6, and discharge the separated sternum through a frame opening 150a into a suitable waste container, not shown, disposed to one side of the frame. The conveyor 151 includes a pair of parallel horizontally spaced pulleys 152, one of which may be driven by a conventional motor or the like, not shown. An endless belt 153 engages the pulleys and is driven thereby. The belt must be substantially wider than the length of the opening 112 formed in surface 111. Furthermore, it is desirable that the belt be readily removable from the pulleys when required for cleaning. Suitable bearings 154 are provided for supporting the pulleys. The bearings 154 are secured to the frame 150 by any suitable means.

When utilizing either form of the improved apparatus 10 or 110, the uncooked eviscerated chicken carcass is longitudinally slit and spread apart so that the sternum, ribs, cartilage, etc., are exposed and face downwardly. With the spread apart carcass so positioned, it is placed over the upper surfaces 20a and 21a or 120a and 121a of the guide members so that the ribs and/or adjacent portions of the carcass rest thereupon. The downwardly facing sternum is then depressed downwardly so that it is recessed relative to the ribs and adjacent portions of the carcass and is in sliding contact with the supporting surface. The sternum should be aligned as closely as possible with the longitudinal axis of the elongated opening. The carcass is slidably moved along the guide members towards the element 16 or 116 whereupon the forward or leading end of the sternum will move beneath the rearwardly facing pointed ends 17d and 18d or 117d and 118d of the element. Upon continued movement of the carcass lengthwise of the opening 12, the upwardly protruding finlike portion of the sternum will be accommodated within the slot or space S between the rodlike members, while the remainder of the sternum is disposed beneath the rodlike members. As the leading portion of the sternum engages the curved surface of the rodlike members, it will be cammed downwardly, thereby causing the sternum to separate from the ribs and adjacent portions of the carcass and fall by gravity through the opening 12 into the waste container 15, disposed therebeneath or onto the conveyor 151. If desired, the lower end portion of the slots may be enlarged slightly so as to facilitate passage therethrough of the finlike portion of the separated sternum. In some instances, the guide members may be omitted; however, in such an arrangement, care must be exercised when the carcass is being manually moved so that the fingers of the operator do not engage the pointed ends of the rodlike members.

It is important to note in any form of the apparatus that the sternum is readily removed without tearing or otherwise defacing the flesh, skin or meat of the carcass. Thus, with the improved apparatus, no knives or special dexterity is required in order to readily remove the sternum. The components comprising the improved apparatus are of simple configuration and, thus, may be readily cleaned when required. The improved apparatus expedites the deboning operation without fatiguing the operator.

I claim:

1. An apparatus for removing only a sternum from an eviscerated, uncooked chicken carcass which has been slit longitudinally, spread apart and disposed in an inverted position so as to expose the sternum, ribs and adjacent portions of the carcass, said apparatus comprising a fixed supporting surface on which the inverted spread apart carcass is adapted to be slidably mounted, said surface being provided with a single elongated opening sized to permit passage therethrough of the sternum subsequent to being separated from the remainder of the carcass while the integrity of the latter is preserved; and an elongated fixedly mounted element protruding from a first end of said opening and curving upwardly therefrom towards an opposite second end of the opening and terminating adjacent thereto whereby a substantial portion of said element is exposed and is disposed in overlying spaced registered relation with respect to said surface opening, the end of said element adjacent said opening second end being tapered and provided with an elongated open end slot whereby segments of said slotted end are adapted to simultaneously engage spaced portions of the exposed end of the sternum and separate the latter from the remainder of the carcass, the integrity of which is preserved as the carcass is moved across the surface longitudinally of the opening in a direction from the second end to the first end of the opening.

2. The apparatus of claim 1 wherein said supporting surface includes a pair of elongated guide means projecting upwardly from said surface and extending convergently towards the second end of said opening, said guide means being adapted to be slidably engaged by the ribs and adjacent portions of the inverted carcass whereby the sternum is recessed intermediate the guide means and slidably engages the supporting surface.

3. The apparatus of claim 2 wherein at least a portion of the opposed side surfaces of said guide means adjacent the convergent ends thereof are undercut whereby the upper edge of each opposed side surface overhangs the lower edge thereof.

4. The apparatus of claim 2 wherein the elevation of the upper surfaces of said guide means with respect to the supporting surface is at least as great as that of the free end of said elongated element and said free end is disposed intermediate said guide means.

5. The apparatus of claim 1 wherein said elongated element comprises a pair of rigid rods arranged in spaced substantially parallel relation, the end of each rod overlying said elongated opening being tapered to form a substantially pointed tip.

6. The apparatus of claim 5 wherein said supporting surface has a substantially planar exposed area, and said supporting surface is provided with means for removably mounting said apparatus on an upper open end of a waste container.

7. the apparatus of claim 5 wherein a perimetric portion of said supporting surface defining the second end of the opening is downwardly inclined towards said opening.

8. The apparatus of claim 1 wherein said supporting surface is mounted on an upright frame and an endless conveyor is mounted on said frame, said endless conveyor having an upper run spaced beneath said supporting surface and adapted to receive a separated sternum passing through said opening; said conveyor upper run being movable laterally in one direction through an opening in said frame to a discharge station disposed exteriorly of said frame.

9. A method of removing a sternum from an eviscerated, uncooked chicken carcass slit longitudinally and spread apart so as to expose the sternum, ribs and adjacent portions of the carcass, said method comprising inverting the spread apart carcass and positioning same and the sternum thereof on a fixed planar surface having an elongated opening formed therein and sized to permit a separate sternum to pass therethrough, moving the inverted spread apart carcass towards one end of the elongated opening whereby the leading end of the sternum moves beneath a slotted tapered end of a fixed elongated member which projects upwardly and rearwardly from the opposite end of the opening and overlies in spaced relation the remainder of the opening, and continuing moving the inverted spread apart carcass lengthwise of the opening whereby the sternum is cammed downwardly by the fixed elongated member through the opening and separated from the remainder of the carcass while the latter remains in engagement with the planar surface.

* * * * *